United States Patent

[11] 3,615,584

| [72] | Inventors | Kermit F. Schlamb;<br>Eugene Bortsky, both of Pittsburgh, Pa. |
|---|---|---|
| [21] | Appl. No. | 862,933 |
| [22] | Filed | Oct. 1, 1969 |
| [45] | Patented | Oct. 26, 1971 |
| [73] | Assignee | Calgon Corporation<br>Continuation-in-part of application Ser. No. 758,588, Sept. 9, 1968, now abandoned. |

[54] METHOD OF PREPARING COMMINUTED POULTRY PRODUCT
4 Claims, No Drawings

[52] U.S. Cl. .................................................. 99/108
[51] Int. Cl. ...................................................... A22c 21/00
[50] Field of Search ............................................ 99/107, 108

[56] References Cited
UNITED STATES PATENTS
3,413,127  11/1968  Schwall et al................  99/107

*Primary Examiner*—Hyman Lord
*Attorney*—Buell, Blenko & Ziesenheim

ABSTRACT: A formed poultry product comprising residual deboned comminuted poultry meat about 0.25 to 1 percent by weight of molecularly dehydrated phosphate and about 0.5 to about 2 percent by weight sodium chloride and a method of preparing the same.

METHOD OF PREPARING COMMINUTED POULTRY PRODUCT

This application is a continuation-in-part of my copending application Ser. No. 758,586 filed Sept. 9, 1968, now abandoned.

This invention relates to comminuted poultry products and methods of making the same and particularly to products made from recovered residual poultry meat from raw deboning devices such as Paoli machines, Beehive deboners and centrifugal separators used to remove residual poultry flesh normally adhering to the bone following conventional deboning operations.

The recovered poultry meat from mechanical deboning of chicken, turkey or like carcasses, although having a good protein content and relatively low fat content and being relatively economical to produce has a very limited market. Its cook yield is generally poor, its binding qualities poor, and its flavor and taste leave a great deal to be desired.

We have discovered that the addition of certain food grade phosphates, wet or dry, to the raw deboned chicken will, upon cooking, result in a product with low cook shrink and excellent binding quality and which will have excellent oxidative stability providing the starting raw meat had a relatively low T. B. A. value at the time of treatment. We have found that this improvement is particularly apparent in the presence of sodium chloride which markedly improves the flavor and the cook shrink and binding properties.

We have confirmed what is recognized in the industry, that raw deboned poultry meat, as from a Paoli machine herein called Paoli meat, will have a very high shrink when cooked. This shrink value will be in the neighborhood of 20 to 40 percent of the original raw weight. We have found that by adding food grade phosphate to the raw deboned poultry meat, we can reduce the shrink to 10 to 15 percent of the original raw weight. The use of salt (NaC1) in conjunction with food grade phosphates we have found will provide a striking improvement in shrink, reducing the shrink to the neighborhood of 1 percent or less. This is an amazing synergistic effect, the reason for which is not fully understood.

Preferably we add to a mixture of raw deboned comminuted poultry meat, either along alone in admixture with up to 75 percent chunks of poultry, beef or pork meat products, a mixture of a molecularly dehydrated phosphate in the range 0.25 percent to 1 percent and preferably in the range 0.5 to 0.75 percent and sodium chloride in the range of about 0.5 to about 2 percent but preferably 1 to 2 percent based on the raw weight of the poultry meat. Preferably the phosphate and salt are added in the form of a slurry; however, they may be added as a dry mixture or in more dilute form as a solution. While we prefer to add both the phosphate and salt to obtain the synergistic effect which occurs with their combined use, either one alone will make a marked improvement in yield over the raw deboned flesh alone and this invention contemplates such use. Preferably the phosphate and/or salt is added to the meat at a temperature between about 30° to 45° F., (although temperatures from about 25° to 55° may be used), worked into the meat to form a uniform mixture, formed into a desired shape and cooked. Preferably the mixture is cooked until an internal temperature of about 180° F. is reached.

We have set out certain objects, advantages and purposes of our invention in the foregoing general description of our invention. Other objects, purposes and advantages will be apparent from a consideration of the following description of specific examples showing the practical application of our invention to raw deboned poultry flesh.

Example I

Deboned comminuted chicken meat produced from necks and backs by a Paoli deboning machine was taken as the material for this example. An analysis of the raw meat is shown in table I.

TABLE I

Analysis of Raw Paoli Meat

| % $P_2O_5$ | % Moisture | % Protein | % Salt |
|---|---|---|---|
| 0.43 (2 hr. digest) | 69.2 | 13.09 | 0.36 |
| 0.45 (4 hr. digest) | 68.0 | — | — |
| 0.44 (5 hr. digest) | — | — | — |

Control roasts and treated roasts containing salt alone, phosphate alone and mixtures of salt and phosphate were prepared in approximately 400 g. size each. The mixtures were made at temperatures between 34° to 40° F., frozen in foil, then cooked the following day in a 325° F. oven until the internal temperature of all roasts was at least 180° F. (about 2½ hrs.). The cooked roasts were cooled at room temperature 1 hour, drained on a rack for 5 minutes and weighed. Yield data based on the 400-g. treated weight are shown in table 1a.

TABLE 1A
YIELD AND ANALYSIS OF COOKED PAOLI MEAT SAMPLES

| Sample | Percent yield Values | Percent yield Avg. | Percent $P_2O_5$ | Added phosphate* as mix of 85% sodium tripolyphosphate and 15% sodium pyrophosphate | Percent NaCl | Percent moisture |
|---|---|---|---|---|---|---|
| Control | 67.0 / 65.0 | 66.0 | 0.56 | — | 0.41 | 60.5 |
| 0.5% salt | 68.0 / 73.0 | 70.5 | 0.49 | — | 0.82 | 57.9 |
| 1% salt | 86.0 / 86.0 | 86.0 | 0.46 | — | 1.45 | 63.7 |
| 0.5% phosphate | 78.0 / 80.0 | 79.0 | 0.69 | 0.36 | 0.36 | 61.5 |
| 5% phosphate and 0.5% salt | 90.0 / 86.0 | 88.0 | 0.73 | 0.52 | 0.91 | 64.7 |
| 0.5% phosphate and 1% salt | 90.0 / 90.0 | 90.0 | 0.68 | 0.42 | 1.49 | 64.6 |

*Percent phosphate=2.0 (total percent $P_2O_5$—natural percent $P_2O_5$).
NOTE: Natural $P_2O_5$ is calculated here using 0.44% as $P_2O_5$ level in raw Paoli, and 0.21% as natural $P_2O_5$ level in cooked juices. Thus, natural percent $P_2O_5$ (in cooked meat) = $\frac{0.44 - (0.21 \times \text{percent juice}/100)}{\text{Percent meat}/100 \text{ yield}}$

Example II

Frozen turkey Paoli meat was partially defrosted so that it could be weighed. Four lots were prepared. One lot was beaten for 3 minutes, flat paddle with a setting of 2 on a Hobart dough mixer. From this was formed two 400-g. pan roasts and two rolls, 273 and 323 g. net, respectively. All rolls were formed in 1½-inch diameter Mylar casings. A second lot was beaten 3 minutes with 1.75 percent added salt (NaCl) and formed into two 400-g. pan roasts and two rolls, 336 and 309 g., respectively. A third lot was beaten 3 minutes with 2 percent of a 25 percent slurry of a mixture of 85 percent sodium tripolyphosphate and 15 percent sodium pyrophosphate and formed into two 400-g. pan roasts and two rolls of 263 g. each. The fourth lot was beaten for 1 minute with 2 percent of the mixture of sodium tripolyphosphate and sodium pyrophosphate, above referred to; salt (NaCl) was then added in an amount of 1.75 percent and beating continued for an additional 2 minutes. From this was formed two 400-g. pan roasts and two rolls of 322 and 439 g., respectively. All meat was at 30°–31° F. when formed into rolls and roasts. The roasts were foil covered, frozen at −10° F. and later cooked in a 325° F. oven to a 180° F. internal temperature. The rolls were placed in 150° F. water immediately after forming for 15 minutes, then the water temperature was raised to 160° F. for 15 minutes and finish cooked to 162° F. internal in 175° F. water. Rolls were slush ice cooled, examined, drained, and weighed. The roasts were air-cooled, examined, drained, and weighed. The results appear in tables II and IIa.

Example III

Frozen turkey Paoli meat was defrosted to approximately 45° F. and divided into six lots for testing. Two lots were brought up to 75° F., two lots were held at 45°–48° F. and the third was refrozen to 24° F. One unit of each lot was used as a control and the other unit of each lot was beaten for 1 minute with 2 percent of the phosphate mixture slurry of example II and then for 2 additional minutes with 1.75 percent added salt (NaCl). All lots received 3 minutes of total beating in a flat paddle dough mixer at a speed setting of 2. After beating, each unit was placed in 1½-inch diameter Mylar casings. The casings were placed in 150° F. water for 15 minutes, then the temperature was raised to 175° F. until 162° F. internal temperature was reached. The rolls were then chilled in slush ice, held over night in a refrigerator, examined, drained and weighed. The results appear in table III.

TABLE II
DATA: Rolls

| Number | Treatment | Initial weight (gm.) | Drained cooked weight (gm.) | Percent yield | Comment |
|---|---|---|---|---|---|
| 1 | Control, Beaten 3 min | 273 | 201 | 73.9 | Mush, granular texture, red flocks in juice, fair bind. |
| 2 | do | 323 | 230 | 71.2 | |
| Total | | 596 | 431 | | |
| Average | | 298 | 215 | 72.55 | |
| 3 | 1.75% NaCl, Beaten 3 min | 336 | 312 | 95.8 | Slightly granular texture, juice grey with little flock; bound, slight salt bite. |
| 4 | do | 309 | 290 | 93.9 | |
| Total | | 645 | 602 | | |
| Average | | 322.5 | 301 | 94.84 | |
| 5 | 0.50% phosphate, Beaten 3 min | 263 | 228 | 86.7 | Not granular, flat taste, much red flock in juice, bound well. |
| 6 | do | 263 | 234 | 89.0 | |
| Total | | 526 | 462 | | |
| Average | | 263 | 231 | 87.83 | |
| 7 | 0.50% phosphate, 1.75% salt beaten 3 min | 322 | 316 | 98.1 | Good texture (bologna), smooth, no salt bite. |
| 8 | do | 439 | 433 | 98.6 | |
| Total | | 761 | 746 | | Juice almost clear, very good taste. |
| Average | | 380.5 | 373 | 98.38 | |

TABLE IIa
DATA: Roasts

| Number | Treatment | Initial weight (gm.) | Drained cooked weight (gm.) | Percent yield | Comment |
|---|---|---|---|---|---|
| 1 | Control | 400 | 299 | 74.75 | Much red flock, protein coagulum present, granular, breaks easily. |
| 2 | do | 400 | 308 | 77.00 | |
| Total | | | 607 | | |
| Average | | | 303 | 75.75 | |
| 3 | 1.75% NaCl | 400 | 370 | 92.5 | Trace flock, almost no juice, no protein coagulum, slight salt bite, brown, good bind. |
| 4 | do | 400 | 363 | 90.75 | |
| Total | | | 733 | | |
| Average | | | 366.5 | 91.63 | |
| 5 | 0.50% phosphate | 400 | 342 | 85.5 | Brown flock, almost no protein coagulum, flat taste, meat pink, much juice, not granular. |
| 6 | do | 400 | 354 | 88.5 | |
| Total | | | 696 | | |
| Average | | | 348 | 87.0 | |
| 7 | 0.50% phosphate plus 1.75 NaCl | 400 | 380 | 95.0 | Clear juice, no protein coagulum, good bind, better flavor than roll, no salt bite. |
| 8 | do | 400 | 336 | 96.5 | |
| Total | | | 766 | | |
| Average | | | 383 | 95.75 | |

TABLE III

| Number | Treatment | Net formed weight (gm.) | Cooked divided weight (gm.) | Percent yield | Comment |
|---|---|---|---|---|---|
| 1 | 75° F. (Control) | 512 | 419 | 81.83 | Red flocked juice, not much fat. |
| 2 | do | 567 | 472 | 83.25 | Fat cap, very crumbly, granular. |
| Total | | 1,079 | 891 | | |
| Average | | 540 | 446 | 82.54 | |
| 3 | 76° F. (phosphate and salt) | 522 | 420 | 80.46 | Fat cap, granular, not much bind. |
| 4 | do | 581 | 461 | 79.35 | Better than 1 or 2, less than 7 or 8. |
| Total | | 1,103 | 881 | | |
| Average | | 552 | 441 | 79.91 | |
| 5 | 45° F. (Control) | 549 | 423 | 77.05 | Pronounced fat caps, not bound. |
| 6 | do | 591 | 461 | 78.00 | Much red flock, not well bound. |
| Total | | 1,140 | 884 | | |
| Average | | 570 | 442 | 77.52 | |
| 7 | 46° F. (phosphate and salt) | 570 | 498 | 87.37 | Pronounced fat cap. |
| 8 | do | 568 | 486 | 85.56 | Gelatinous material less than 5 and 6, well bound, reddish brown color. |
| Total | | 1,138 | 984 | | |
| Average | | 569 | 492 | 86.47 | |
| 9 | 24° F. (phosphate and salt) | 568 | 536 | 94.37 | Slight trace fat, no gelatin, bound. |
| 10 | do | 556 | 533 | 95.86 | Greyish brown color. |
| Total | | 1,124 | 1,069 | | |
| Average | | 562 | 535 | 95.12 | |
| 11 | 24° F. (Control) | 572 | 449 | 78.50 | Some fat cap—less than 5-8. |
| 12 | do | 580 | 477 | 82.24 | Much gelatinous material; not bound; looks wet; grey brown color. |
| Total | | 1,152 | 926 | | |
| Average | | 576 | 463 | 80.37 | |

The percent yield data is summarized in table IIIa.

TABLE IIIa

% Yield

| | 24° F. | 45°–46° F. | 75°–76° F. |
|---|---|---|---|
| Control | 80.37 | 77.52 | 82.54 |
| Phosphate—Salt | 95.12 | 86.47 | 79.91 |

Example IV

Again turkey Paoli meat was defrosted, one lot to a temperature of 29°–30° F. and another to a temperature of 45° F. Each lot was separated into two units, one for a control and the other to which was added phosphate and salt as in example III. Each unit was beaten for a total of 3 minutes as in example III and formed into rolls. The rolls were cooked for 15 minutes at 150° F. and then cooked at 175° F. to 162° F. internal temperature. The rolls were slush ice cooled, drained, weighed and examined. The results are tabulated in table IV.

TABLE IV

| No. | Treatment | Initial net wt., gms. | Final wt., gms. | Yield, percent |
|---|---|---|---|---|
| 1 | Control—beaten at 30° F | 583 | 462 | 79.24 |
| 2 | do | 589 | 472 | 80.13 |
| Average | | | | 79.69 |
| 3 | 0.5% phosphate, 1.75% salt—beaten at 29–30° F | 602 | 600 | 99.67 |
| 4 | do | 602 | 596 | 99.00 |
| Average | | | | 99.33 |
| 5 | 0.5% phosphate, 1.75% salt—beaten at 47° F. | 610 | 526 | 86.23 |
| 6 | do | 565 | 472 | 83.54 |
| Average | | | | 84.89 |
| 7 | Control—beaten at 48° F | 622 | 464 | 74.60 |
| 8 | do | 523 | 395 | 75.52 |
| Average | | | | 75.06 |

Example V

In order to determine the influence of ground turkey meat with turkey Paoli meat, rolls of mixed turkey Paoli meat and ground meat were prepared as follows:

| No. | | |
|---|---|---|
| 1 | All Paoli | Plus 2% phosphate slurry plus 1.75 salt plus pepper plus sage. |
| 2 | 20% Paoli plus 80% coarse grd. turkey | Do. |
| 3 | 40% Paoli plus 60% coarse grd. turkey | Do. |
| 4 | 60% Paoli plus 40% coarse grd. turkey | Do. |
| 5 | 80% Paoli plus 20% coarse grd. turkey | Do. |

Meat was ground through ⅝-inch diameter plate in semifrozen (28° F.) state. To 2,400 g. Paoli meat were added 36 g. of 25 percent slurry, 31.5 g. salt, 4.5 g. ground pepper (0.25 percent) percent) and 4.5 g. sage (0.25 percent): slurry was poured over meat, mixed 1 minute, salt added and mixed 1 additional minute, sage and pepper added, and mixing completed. To 1,200 g. coarse ground meat were added 24 g. slurry, 21 g. salt, 3.0 g. pepper, 3.0 g. sage. This was mixed in like manner to the Paoli meat. From the Paoli meat were formed two rolls, one of which to be frozen and cooked later. Then combinations of ground meat and Paoli meat were made by mixing the two basic mixes above, 30 seconds in the mixer. Rolls were cooked in normal manner at 150° F. for 15 minutes and finished at 175° F. to 162° F. internal, then slush ice chilled. Rolls were then drained, weighed, and examined. The results appear in table V.

Some slices were taken from rolls 1, 2 and 4 for breading and battering and then freezing. Slices were sliced at approximately 30 setting on Hobart slicer.

TABLE V

| No. | % Grd. Meat | % Paoli | Initial Wt. (Net) | Cooked Weight | % Yield |
|---|---|---|---|---|---|
| 1 | — | 100 | 578 g. | 576 g. | 99.47 |
| 2 | 80 | 20 | 581 g. | 562 g. | 96.73 |
| 3 | 60 | 40 | 577 g. | 572 g. | 99.13 |
| 4 | 40 | 60 | 609 g. | 602 g. | 98.85 |
| 5 | 20 | 80 | 590 g. | 585 g. | 99.15 |

Example VI

Chicken Paoli meat was partially defrosted and divided into six equal lots of 600 g each. To lot 1 was added 2 percent of the 25 percent phosphate mixture used in previous examples and the mixture was beaten for 3 minutes and formed into a roll. To lot 2 was added 1 percent salt (NaCl) and the mixture beaten for 3 minutes and formed into a roll. To lot 3 was added 1.5 percent salt (NaCl) and the mixture beaten for 3 minutes and formed into a roll. Lot 4 had 2 percent of the phosphate slurry added, was beaten 1 minute and then 1 percent salt was added and the mixture beaten an additional 2 minutes and formed into a roll. Lot 5 had 2 percent of phosphate slurry and 1.5 percent salt added and lot 6 had 2 percent phosphate slurry and 2 percent salt added, then beaten and formed into rolls in the same manner as the others with phosphate and salt. All lots had 0.175 percent black pepper and 0.4 percent sage added for flavor. All rolls were cooked in water at 150° F. for 15 minutes and then at 175°–180° F. to 162° F. internal temperature, slush ice cooled, examined and weighed. The results are set out in table VI.

TABLE VI

| No. | Treatment | Net initial wt., gms. | Drained cooked wt., gms. | Percent yield | Comment |
|---|---|---|---|---|---|
| 1 | Paoli chicken plus 0.5% phosphate. | 610 | 524 | 85.9 | Much liquid. |
| 2 | Paoli chicken plus 1.0% NaCl. | 608 | 520 | 85.5 | Do. |
| 3 | Paoli chicken plus 1.5% NaCl. | 613 | 539 | 87.9 | Do. |
| 4 | Paoli chicken plus 1% NaCl plus 0.5% phosphate. | 618 | 594 | 96.1 | Traces gelatin in pockets. |
| 5 | Paoli chicken plus 1.5% NaCl plus 0.5% phosphate. | 622 | 602 | 96.8 | Hard, no gelatin. |
| 6 | Paoli chicken plus 2.0% NaCl plus 0.5% phosphate. | 620 | 601 | 96.9 | Do. |

Example VII

Paoli chicken meat was defrosted to 28° F. and cut into cubes approximately 1 inch square. Three lots of 600 g. each were made. One lot was placed in 60° water bath to bring its temperature to 60° F. The second lot was placed in 45° F. water bath to bring meat to 45° F. The third lot was held at 28° F. To each lot was added 2 percent of 25 percent phosphate slurry (12 g.) of a mixture of about 85 percent sodium tripolyphosphate and 15 percent sodium pyrophosphate and 10.6 g. salt (1.75 percent) to which had been added 0.1 percent spicing compound. When the desired temperature was reached, the rolls were formed in the standard manner. After beating, before stuffing the meat, the temperature was determined. Rolls were held in the refrigerator 20 hours prior to cooking in the normal manner after cooking and slush ice cooling, rolls were examined and weighed. The results appear in table VII.

TABLE VII

| No. | Temperature when Formed | Net Raw Wt. | Net Cooked | % Yield | Comment |
|---|---|---|---|---|---|
| 1 | 59° F. | 604 g. | 550 g. | 91.06 | Gelatin covered (flavor strong) |
| 2 | 46° F. | 613 g. | 607 g. | 99.02 | Smooth, clear juice |
| 3 | 28° F. | 617 g. | 609 g. | 98.70 | Smooth, clear juice |

Number 3 had definite particle (chunk) indications. Numbers 1 and 2 were definitely smooth textured. Bind was good. No rubberiness. High-temperature meat did not cut smoothly. When slices of the rolls were fried in a skillet set at 375° F., the two low-temprature lots shrank 13.6 and 13.9 percent respectively. The 60° F. meat shrank 33.2 percent. Frying was done in butter 3 minutes on each side. Slices were 30–38 g. each; three slices of each used. Physical shrink was very evident on the high-temperature roll (No. 1), but not evident on low-temperature rolls. Two and a half minutes would have been better frying, but since we used 3 minutes to start, we did not change. The fry results were tabulated in table VIIa.

TABLE VIIa

|  | Unfried, gms. | Fried, gms. | Loss, gms. |
|---|---|---|---|
| Roll #1: Slice: | | | |
| 1 | 29.1 | 18.3 | 10.8 |
| 2 | 33.3 | 22.8 | 10.5 |
| 3 | 38.1 | 26.0 | 12.1 |
| Total | 100.5 |  | 33.4 |
| Roll #2: Slice: | | | |
| 1 | 38.4 | 33.0 | 5.4 |
| 2 | 36.5 | 31.9 | 4.6 |
| 3 | 31.3 | 26.9 | 4.4 |
| Total | 106.2 |  | 14.4 |
| Roll #3: Slice: | | | |
| 1 | 38.9 | 33.8 | 5.1 |
| 2 | 41.6 | 36.3 | 5.3 |
| 3 | 37.5 | 31.8 | 5.7 |
| Total | 118.0 |  | 16.1 |

Example VIII

Chicken Paoli meat was chunked at 28° F. and mixed thoroughly by tumbling gently; then separated into two 600-g. lots. One lot was placed in 45° F. water bath, and the second was placed in 60° F. water bath. When the meat temperature reached these levels, the meat was placed in the Hobart Mixer, flat paddle equipped, on a speed setting of 2, and a water bath was utilized to maintain the desired temperature during mixing. Two percent of a 25 percent phosphate slurry was added and mixed 1 minute, then 1.75 percent salt was added and mixing continued. The slurry was made from a mixture of about 85 percent sodium tripolyphosphate and about 15 percent of sodium pyrophosphate. The salt contained 1 percent of added seasonings. After mixing a total of 3 minutes, rolls were formed and immediately cooked at 150° F. for 15 minutes and then finish cooked at 175° F. to an internal of 162° F. Rolls were then slush ice chilled to 60° F. internal and examined. The results appear in table VIII.

TABLE VIII.—DATA

| No. | Treatment | Initial wt., gms. | Cooked wt., gms. | Percent yield | Comment |
|---|---|---|---|---|---|
| 1 | 45° F. when formed. | 599 | 591 | 98.66 | No gelatin, less stringy than 2. |
| 2 | 61° F. when formed. | 603 | 566 | 93.86 | Gelatin, less bind, does not slice as cleanly as 1. |

Slices from each roll were fried at 3 minutes on a side at 375° F. in butter with the following results (table VIIIa).

TABLE VIIIa

| Number 1 | | |
|---|---|---|
| Initial wr., gms, | Fried wt., gms. | Percent loss |
| 46.10 | 41.43 | |
| 43.22 | 38.61 | |
| 42.42 | 37.75 | |
| 131.74 | 117.79 | 10.6 |
| Number 2 | | |
| 47.28 | 34.55 | |
| 49.32 | 36.86 | |
| 46.66 | 34.15 | |
| 143.26 | 105.56 | 26.3 |

Example IX

Chicken Paoli meat was partially defrosted, cut into 1-inch cubes (approx.), hand mixed, and divided into four lots. Using a water bath the temperature of one lot was raised to 45° F., the second lot to 50° F., the third lot to 55° F. and the fourth to 60° F. Each lot was treated with 2 percent slurry of a mixture of about 85 percent sodium tripolyphosphate and about 15 percent sodium pyrophosphate, beaten 1 minute, 1.5 percent salt added and beating completed for 2 additional minutes. A water bath was used to assist in maintaining temperature. Rolls were formed and returned to bath after forming while other rolls were being formed. When all rolls were formed, they were placed in 150° F. water 15 minutes. Rolls were cooked 1 hour at 175° F. Then the water temperature was raised to boiling and the rolls finished to an internal temperature of 188° F. The rolls were slush ice cooled to 55° F., the casings opened and examined. The results appear in table IX.

Example X

Partially defrosted frozen Paoli chicken meat was cut into cubes approximately 1 inch per side. All meat was taken from same block and mixed thoroughly prior to dividing into lots. Seventeen containers of 500 g. meat each were prepared. To one lot of each was added 0.50 percent NaCl, 0.75 percent NaCl, 1.00 percent NaCl, 1.25 percent NaCl, 2 percent phosphate slurry, 1.5 percent phosphate slurry, 1 percent phosphate slurry, 0.50 percent phosphate slurry, and then 1.25 percent salt (NaCl) plus 2 percent, 1.5 percent, 1.0 percent, and 0.50 percent phosphate slurry. In addition, all combinations of 0.75 percent salt (NaCl) plus 2 percent, 1.5 percent, 1.0 percent and 0.5 percent slurry were made. An ice bath was used around the mixer. The phosphate was added and mixed 1 minute, salt was added and mixing was continued for an additional 2 minutes. Rolls were formed and held in ice bath till cooking. Where phosphate was not used, mix 1 minute, add salt and mix 2 additional minutes. All were held overnight prior to cooking and then cooked at 150° F. for 15 minutes, followed by finish cooking at 175° F. to 162° F. internal. All were slush ice cooled to 50° F. internal, examined and weighed. The results appear in table X.

TABLE IX

| No. | Temperature when formed | Raw wt., grams | Cooked wt., grams | Percent yield | Comment |
|---|---|---|---|---|---|
| 1 | 61° F. initial | 430 | 392 | 91.2 | Gelatin and fat globules. |
| 2 | 61° F. initial | 433 | 398 | 91.9 | |
| Total | | 863 | 790 | | |
| Average | | | | 91.54 | |
| 3 | 56° F. initial | 433 | 415 | 95.8 | Clear juice, trace gelatin, no fat. |
| 4 | 56° F. initial | 432 | 412 | 95.4 | |
| Total | | 865 | 827 | | |
| Average | | | | 95.61 | |
| 5 | 50° F. initial | 432 | 417 | 96.5 | Clear juice, trace gelatin, no fat. |
| 6 | 50° F. initial | 434 | 419 | 96.5 | |
| Total | | 866 | 836 | | |
| Average | | | | 96.54 | |
| 7 | 44° F. initial | 438 | 425 | 97.0 | Clear juice, minor trace gelatin. |
| 8 | 44° F. initial | 437 | 423 | 96.8 | |
| Total | | 875 | 848 | | |
| Average | | | | 96.81 | |

TABLE X

| Roll No. | NaCl Gms. | NaCl Percent | Phosphate,[1] gms. | Slurry percent phosphate[1] | Net raw formed wt., grams | Net cooked wt., grams | Percent yield | Comments |
|---|---|---|---|---|---|---|---|---|
| 1 | 2.5 | 0.5 | | | 500 | 382 | 76.40 | Protein exudate, fatcap, red juice, gelatin. |
| 2 | 3.75 | 0.75 | | | 502 | 414 | 82.47 | Do. |
| 3 | 5.00 | 1.00 | | | 500 | 421 | 84.20 | Trace protein exudate, less fat, brown juice, more gelatin. |
| 4 | 7.50 | 1.25 | | | 501 | 469 | 93.61 | No protein exudate, trace fat, no juice, light gelatin. |
| 5 | | | 10.0 | 0.5 | 509 | 432 | 84.87 | No protein exudate, fatcap, red juice, gelatin. |
| 6 | | | 7.5 | 0.375 | 506 | 385 | 76.09 | No protein exudate, pronounced fatcap, granular, red juice. |
| 7 | | | 5.0 | 0.250 | 505 | 364 | 72.08 | Trace protein exudate, pronounced fatcap, granular, red juice. |
| 8 | | | 2.5 | 0.125 | 501 | 343 | 68.46 | Do. |
| 9 | 3.75 | 0.75 | 10.0 | 0.50 | 509 | 484 | 95.09 | No protein exudate, no fat, little gelatin, no juice. |
| 10 | 3.75 | 0.75 | 7.5 | 0.375 | 507 | 488 | 96.25 | No protein exudate, no fat, trace gelatin, clear juice. |
| 11 | 3.75 | 0.75 | 5.0 | 0.250 | 508 | 467 | 91.93 | No protein exudate, fatcap (small), gelatin. |
| 12 | 3.75 | 0.75 | 2.5 | 0.125 | 504 | 456 | 90.47 | Clear juice, fatcap, gelatin. |
| 13 | 7.50 | 1.25 | 10.0 | 0.50 | 512 | 502 | 98.05 | No protein exudate, no fat, no gelatin, no juice. |
| 14 | 7.50 | 1.25 | 7.5 | 0.375 | 511 | 498 | 97.45 | No protein exudate, trace fat, trace gelatin, clear juice. |
| 15 | 7.50 | 1.25 | 5.0 | 0.250 | 510 | 489 | 95.88 | No protein exudate, some fat, trace gelatin, clear juice. |
| 16 | 7.50 | 1.25 | 2.5 | 0.125 | 510 | 490 | 98.08 | No protein exudate, fat, trace gelatin, juice clear. |
| 17 | | | | | 497 | 336 | 67.61 | Protein exudate, much fat, red juice, no gelatin. |

[1] Phosphate mixture of about 85% sodium tripolyphosphate plus about 15% pyrophosphate.

Example XI

Fresh pork fat was frozen and ground through 3/32-inch hole plate in meat grinder. Paoli chicken meat was partially defrosted and cubed. For all lots 2 percent of 25 percent phosphate slurry and 1.5 percent Morton's 999 salt were added. For lot 1 (rolls 1 and 2) 965 g. meat, 20 g. slurry and 15 g. salt were used as follows: Add slurry, mix 1 minute, add salt and mix 3 additional minutes, form into two rolls and hold in ice until ready to cook. Use ice bath on mixer to control temperature. For lot 2 (rolls 3 and 4) the same procedure was followed except 100 g. meat were replaced with 100 g. pork fat. For lot 3 (rolls 5 and 6) replace 150 g. meat with 150 g. pork fat. Since on lot 2 it was found that the chilled, ground pork fat had a tendency to cling together and not mix well, the pork fat for lot 3 and succeeding lots (where fat is used) was placed in a warm water bath to soften it to the point of being almost "greasy" or quite pliable. However, as the fat came in contact with the chilled bowl and meat it immediately hardened and the distribution was no better than in lot 2 upon mixing. A high-speed chopper would be a better unit for this type mixing than the Hobart dough mixer. Lot 4 7 and 8) replace 50 g. of Paoli meat with 50 cc. water (ice). For lot 5 (rolls 9 and 10) replace 100 g. of Paoli meat with 100 cc. ice water. For lot 6 (rolls 11 and 12) replace 150 g. Paoli meat with 100 g. fat and 50 g. water. For lot 7 (rolls 13 and 14) replace 250 g. Paoli meat with 150 g. fat and 100 g. water. Immediately upon completion of forming, the rolls were placed in 150° water for 15 minutes and finish cooked at 175° F. to 162° F. internal, then slush ice cooked and examined.

TABLE XI

| Roll No. | Percent meat | Slurry, percent phosphate[1] | Percent salt | Percent H₂O | Percent fat | Net raw wt., grams | Cook weight, grams | Percent yield |
|---|---|---|---|---|---|---|---|---|
| 1 | 96.5 | 2.0 | 1.5 | | | 458 | 452 | 98.68 |
| 2 | 96.5 | 2.0 | 1.5 | | | 455 | 451 | 99.12 |
| Average | | | | | | | | 98.40 |
| 3 | 86.5 | 2.0 | 1.5 | | 10.0 | 465 | 458 | 98.49 |
| 4 | 86.5 | 2.0 | 1.5 | | 10.0 | 461 | 456 | 98.91 |
| Average | | | | | | | | 98.70 |
| 5 | 81.5 | 2.0 | 1.5 | | 15.0 | 461 | 445 | 96.52 |
| 6 | 81.5 | 2.0 | 1.5 | | 15.0 | 470 | 458 | 97.45 |
| Average | | | | | | | | 96.99 |
| 7 | 91.5 | 2.0 | 1.5 | 5.0 | | 446 | 440 | 98.62 |
| 8 | 91.5 | 2.0 | 1.5 | 5.0 | | 482 | 479 | 99.37 |
| Average | | | | | | | | 99.00 |
| 9 | 86.5 | 2.0 | 1.5 | 10.0 | | 454 | 446 | 98.23 |
| 10 | 86.5 | 2.0 | 1.5 | 10.0 | | 450 | 444 | 98.66 |
| Average | | | | | | | | 98.45 |
| 11 | 81.5 | 2.0 | 1.5 | 5.0 | 10.0 | 462 | 457 | 98.91 |
| 12 | 81.5 | 2.0 | 1.5 | 5.0 | 10.0 | 446 | 440 | 98.65 |
| Average | | | | | | | | 98.73 |
| 13 | 71.5 | 2.0 | 1.5 | 10.0 | 15.0 | 471 | 455 | 96.60 |
| 14 | 71.5 | 2.0 | 1.5 | 10.0 | 15.0 | 472 | 466 | 98.72 |
| Average | | | | | | | | 97.66 |

[1] Phosphate mixture of about 85% sodium tripolyphosphate plus about 15% pyrophosphate.

Appearance Information

1. Rolls 9, 10, 13, and 14 were slightly darker than other rolls, indicating some slight change. The color is more brown than any other color.
2. Trace of fat cap found on roll 13 indicating the amount of added fat might be approaching the upper limit of acceptability. However, note that the fat was not in an emulsion form but rather was as small blobs in the meat as a result of using due to beating rather than chopping. A "blob" was normally about half the size of a standard pencil eraser. Such is not likely to occur if a cutter were used.
3. All rolls adhered somewhat to casing; probably the result of 4 minutes beating.

Conclusion

1. It is apparent that chicken Paoli meat of the quality used here can readily bind up to 15 percent fresh pork fat (and possibly more) without a major loss in yield, if treated by our unique method.
2. It is apparent that chicken Paoli meat of the quality used here can bind up to 10 percent added water (and possibly more) when phosphate and salt are properly used.
3. It is apparent from the data that a combination of 10 percent added water and 15 percent added fresh pork fat and Paoli chicken meat can be used when salt and phosphate are used in a low-temperature cooked product.

T.B.A. values are a measure of rancidity. These were determined on our cooked rolls after holding them refrigerated in polyethylene bags for various storage periods. A slice was removed from the face of roll before taking the sample slice. Data are presented in table XLa.

Table XIa

| Roll No. | 4 Days | 6 Days |
|---|---|---|
| 2 | 2.15 | 2.60 |
| 4 | 1.95 | 2.80 |
| 6 | 1.80 | 1.95 |
| 8 |  | 2.45 |
| 10 | 1.65 | 2.00 |
| 12 |  | 2.90 |
| 14 | 1.20 | 1.60 |

It is apparent from the foregoing tests that the addition of a mixture of salt (NaCl) and molecularly dehydrated phosphate in the range of about 1 to about 2 percent of salt and about 0.35 to about 1 percent molecularly dehydrated phosphate will produce a high yield of highly palatable product from a poultry product which heretofore has been considered generally unpalatable and of too low cook yield to be economically processed.

Preferably the molecularly dehydrated phosphates used in our invention lie in the range of 1:1 to 2:1 of $Na_2O$ to $P_2O_5$ and encompass sodium tripolyphosphate, sodium metaphosphate, sodium acid pyrophosphate, tetra sodium pyrophosphate, and mixtures thereof.

While we have illustrated and described a presently preferred meat composition and method of making the same in the foregoing specification, it will be understood that this invention may be otherwise embodied within the scope of the following claims.

We claim:

1. A method of preparing a formed cooked poultry product having improved flavor, cook shrink and binding properties from comminuted raw machine deboned residual poultry meat normally adhering to the bone following conventional deboning and which is low in cook yield and palatability comprising the steps of:
   a. recovering in comminuted form residual deboned poultry meat from a machine deboning operation following conventional deboning;
   b. mixing said comminuted meat with about 0.25 to 1 percent by weight of the comminuted meat of molecularly dehydrated phosphate and about 0.5 to 2 percent by weight of the comminuted meat of sodium chloride at a temperature of about 25° to 55° F.;
   c. forming said mixture at a temperature of about 25° TO 55° F.; and
   d. Cooking said mixture.
2. The method as claimed in claim 1 wherein the phosphate is first mixed into the comminuted mat, followed by mixing the salt with the meat and phosphate mixture.
3. The method as claimed in claim 1 wherein the meat, phosphate and salt mixture is stuffed in a casing prior to cooking.
4. The method as claimed in claim 1 wherein the comminuted poultry meat is admixed with up to 75 percent of other meat products prior to admixing with phosphate and salt.

UNITED STATES PATENT OFFICE
CERTIFICATE OF CORRECTION

Patent No. 3,615,584          Dated October 26, 1971

Inventor(s) Kermit F. Schlamb et al

It is certified that error appears in the above-identified patent and that said Letters Patent are hereby corrected as shown below:

On the cover sheet, the inventor's name "Bortsky" should read -- Brotsky --.

Signed and sealed this 31st day of October 1972.

(SEAL)
Attest:

EDWARD M. FLETCHER, JR.                ROBERT GOTTSCHALK
Attesting Officer                      Commissioner of Patents